United States Patent [19]

Tortora et al.

[11] Patent Number: 5,768,789
[45] Date of Patent: Jun. 23, 1998

[54] CABLE SUPPORT DEVICE

[75] Inventors: William J. Tortora, Willington; Thomas A. Gordon, S. Glastonbury, both of Conn.

[73] Assignee: Gerber Scientific Products, Inc., Manchester, Conn.

[21] Appl. No.: 666,248

[22] Filed: Jun. 20, 1996

[51] Int. Cl.$^6$ .................................................. B43L 13/00
[52] U.S. Cl. ............................................. 33/18.1; 33/32.3
[58] Field of Search ............................. 33/18.1, 26, 32.1, 33/34, 35, 45, 1 M, 430

[56] References Cited

U.S. PATENT DOCUMENTS

| | | | |
|---|---|---|---|
| 3,568,321 | 3/1971 | Maps et al. | 33/18.1 |
| 4,709,483 | 12/1987 | Hembree et al. | 33/32.3 |
| 5,005,296 | 4/1991 | Gerber | 33/18.1 |
| 5,539,987 | 7/1996 | Zennyoji | 33/1 M |

FOREIGN PATENT DOCUMENTS 1675330  12/1971  Germany .
38 43 665A1  7/1989  Germany .

Primary Examiner—Christopher W. Fulton
Attorney, Agent, or Firm—McCormick, Paulding & Huber

[57] ABSTRACT

A vertically looped ribbon cable having upper and lower lengths connected to one another by a 180° bend for carrying power and control signals is attached at one end to a controller and at its other end to a plotter's tool head. The tool head is mounted to, and can move along the length of a tool head support. A cable support device is provided and includes a trough having an interior channel containing the ribbon cable and mounted to the plotter's frame. A vertically looped cable support strip is also positioned in the trough and has an upper support strip length positioned above and connected by a 180° bend in the support strip to a lower support strip length. During movement of the tool head along the length of the support, one of the upper or lower support strip lengths will increase while the other decreases. The ribbon cable is positioned relative to the support strip so that the upper length of the cable overlies and is vertically supported by the upper support strip length.

5 Claims, 2 Drawing Sheets

CABLE SUPPORT DEVICE

FIELD OF THE INVENTION

The present invention relates generally to controlling the operation of a plotter or similar x-y positioning mechanism; and deals more particularly with a device for supporting a ribbon cable attached to a movable tool head for such mechanisms.

BACKGROUND Of THE INVENTION

The present invention has particular utility in connection with the operation of plotters for use with sheet type work materials and is described herein as applied to such use. Plotters, particularly drum plotters, require the simultaneous motion of several components in order to properly function. Typically, one of these moving components, often referred to as a tool head holds and manipulates the tool or implement used to perform a work operation on the work material processed by the plotter. Several different implements can be held by the tool head. For example, a pen can be used to draw an outline on the work material, a print head can be used to print a graphic on the work material, or a knife can be employed to cut a shaped piece from the work material.

The tool head is often mounted on an elongated support located above and extending across the width of the work material and can move back and forth across the support's length, thereby allowing work operations to be performed across the width of the work material. Additionally, the tool head is capable of moving vertically relative to the support between a lowered working position and an upper non-working position.

For the tool head to properly manipulate an implement to perform a work operation it is necessary to supply power or command signals or data from a controller to the tool head, and a suitable supply conduit is needed which is often in the form of a ribbon cable consisting of a number of flexible individual electrical conductors, and/or pressure fluid conductors, joined together to form a flat tape.

Because the tool head traverses the length of the support, it is necessary for one end of the ribbon cable to move with the tool head and sufficient slack must be provided in the cable to accommodate such movement. To neatly accommodate the slack in a small space, the ribbon cable is vertically looped into a loop configuration wherein an upper length of the cable is positioned above a substantially parallel lower length with the upper and lower lengths being joined by a 180° bend in the cable. As the tool head traverses back and forth across the work material, the upper and lower lengths of the looped cable increase or decrease in length dependent upon the direction of tool head movement. A problem however sometimes occurs when the upper length of the cable becomes too long. When this happens, the cable tends to sag and may bind or become entangled so as to no longer move smoothly with the tool head; and in some cases this can render the plotter non-functional.

In known plotters, the ribbon cable is contained within a channel. The channel is intended to protect and guide the cable during plotter operation, but when contained in such channel, the cable has been known to contact the upper surface of the channel and bind against it. When this happens, the same problem as previously described may occur. In the past, this binding problem has been dealt with by reducing the friction between the ribbon cable and the channel. For example, Teflon™(a trademark of Dupont) or low friction tapes have been installed on the upper surface of the channel, but with mixed results.

Based on the foregoing, it is important that a ribbon cable of the type in question be prevented from binding or becoming entangled. Additionally, the means employed to prevent such problems should achieve reliable and repeatable results.

Accordingly, it is the general object of the present invention to provide a support device for a vertically looped ribbon cable which device effectively prevents binding, sagging, tangling and other problems in its handling of the cable.

A more specific object of the present invention to provide a means for retaining a ribbon cable support such that the ribbon cable, the support mechanism, and the tool holder all move in concert.

A still further object of the present invention is to retain the ribbon support mechanism in such a manner as to eliminate the likelihood of fatigue failure.

SUMMARY OF THE INVENTION

The present invention resides in a ribbon cable support device for a plotter comprising a tool head support carried by the frame of the plotter and having a predetermined length. A tool head carrying a tool for work on the work material is slidably mounted to the tool head support. A drive means associated with the tool head drives the tool head back and forth along the length of the support in response to commands issued from a controller. A ribbon cable is attached at one end to the tool holder, and at its other end is in communication with the controller to enable the tool holder to receive commands from the controller. The cable has sufficient slack between the tool holder and the controller to allow the end of the cable attached to the tool head to move with the tool head. The ribbon cable is supported by a support device including, an elongated trough member mounted to the plotter frame for guiding the cable as its one end moves with the tool head. The trough member has a rear wall and opposed upper and lower walls defining a semi-enclosed interior channel containing the ribbon cable. The supporting device for the cable is a flexible support strip attached at one end to the lower wall of the trough member by a first clamping means and attached at its other end a second clamping means to the tool holder. This method of attachment causes the cable support strip to assume a vertically looped shape having an upper and lowers connected to one another by a 180° bend. As the tool head traverses the length of the tool head support, the end of the cable support strip attached to the tool head moves with the tool head thereby causing one of the upper or lower support strip lengths to increase while the other decreases. The upper length of the ribbon cable is supported by the upper support strip length thereby preventing the ribbon cable from sagging and interfering with the travel of the tool head during operation of the plotter.

The present invention further resides in the first clamping means comprising a clamping bar having a first and second end, and an upper and lower surface. The lower surface has a step in it such that the second end of the lower surface is upwardly offset from the first end of the lower surface. The clamping bar is attached at the first end of the lower surface to the trough lower wall. The clamping bar also has a threaded hole extending through the second end. One end of the cable support strip is positioned under the second end of the clamping bar lower surface. The step creates a gap between the clamping bar lower surface and the cable support strip. A portion of the ribbon cable is positioned between the cable support strip and the trough lower wall. A fastener is threaded into the threaded hole and brought into pressing engagement with the cable support strip thereby clamping the cable support strip and the ribbon cable at a single point between the fastener and the trough member lower wall.

The present invention still further resides in that the cable support strip has a transverse width having an arcuate contour. A second clamp is provided to clamp the cable support strip to the tool head. The second clamp has an upper clamp member with a convex portion, and a lower clamp member having a concave portion. The concave and convex portions having substantially the same arcuate contour as the transverse width of the ribbon cable. An end of the ribbon cable support strip and a portion of the ribbon cable are interposed between the concave and convex portions. The convex portion seats within the concave portion. The upper and lower clamp members are connected by fasteners, such that the cable support strip and the ribbon cable are clamped between the upper and lower clamp members without significantly deforming the arcuate shape of the transverse width of the cable support strip.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

Figure 1:
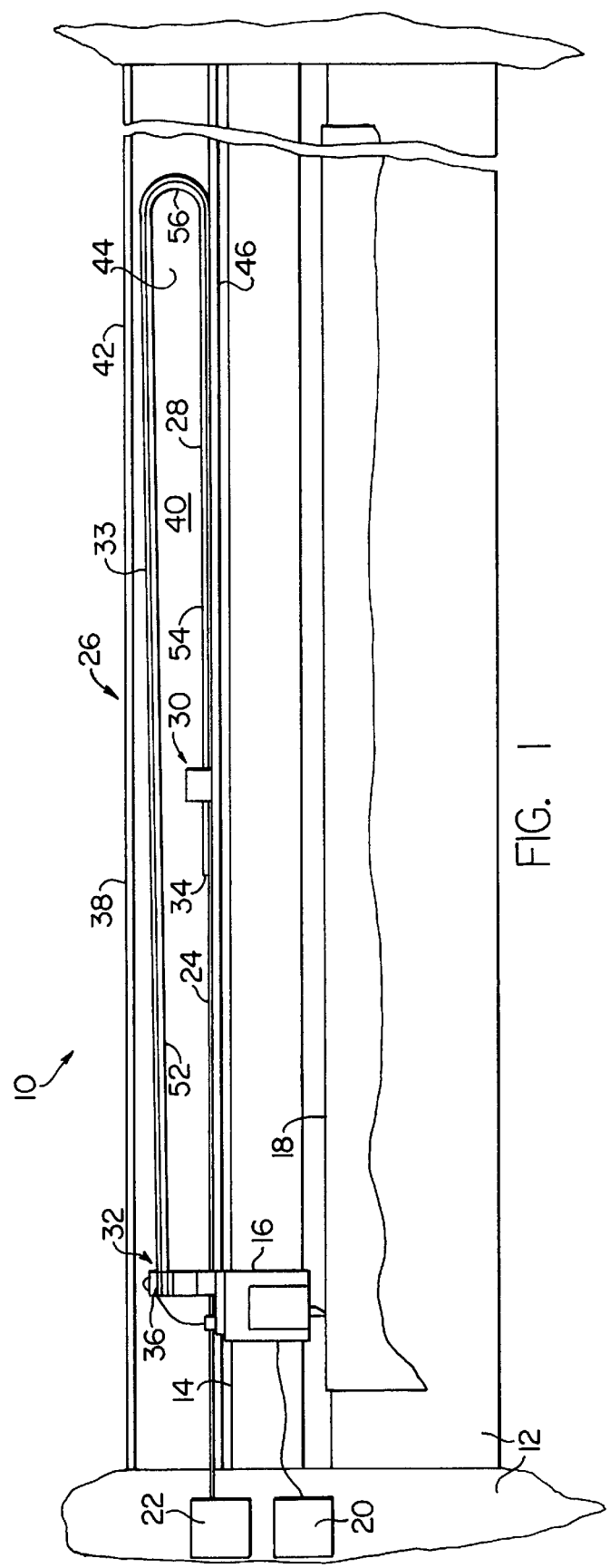
FIG. 1 is a front partial elevation of the plotter showing the ribbon support device of the present invention.

Various details of plotter construction and ancillary mechanisms concerned with the operation of a plotter are well known in the art and need not be described as by themselves they form no part of the present invention. Therefore, turning to the drawings and first referring to FIG. 1, the preferred embodiment of a plotter having a cable support device, there shown and generally designated as 10, comprises a frame 12, a tool head support 14 is mounted to the frame 12. A tool head 16 is slidably mounted to the frame 12 such that it can traverse the width of the work material 16 being processed. A drive means 18 is provided to drive the tool head 16 along the tool head support 14 in response to commands issued from a controller 22. A ribbon cable 24 is connected at one end to the controller 22 and at a second end, to the tool head 16. The ribbon cable 24 provides the means by which the data necessary to control the work material processing operation is transferred from the controller 22 to the tool head 16. As such, the ribbon cable 24 must move at the end connected to the tool head 16, with the tool head 16. Therefore, ribbon cable 24 must have sufficient slack to allow the tool head to traverse the length of the tool head support 14.

Still referring to FIG. 1, a cable support device there shown and generally designated as 26 comprises, an elongated trough member 38 mounted to the frame 12 having a semi-enclosed interior area 40. The semi-enclosed interior area 40 is defined by upper wall 42, opposed lower wall 46, and rear wall 44. An elongated cable support strip 28 having ends 34, 36 is positioned in said semi-enclosed interior area.

Figure 2:
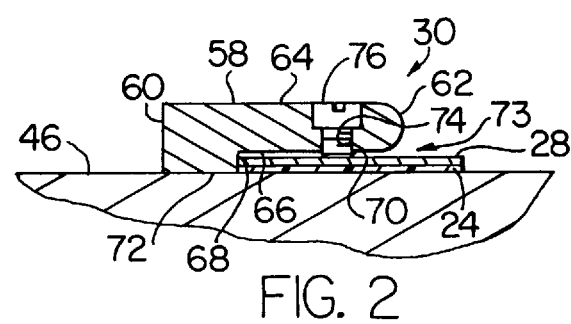
FIG. 2 is a sectional view of the first clamping means of the ribbon support device of the present invention.

The elongated cable support strip 28 is made of a suitable material such as, for example, a thin metal strip. In the preferred embodiment the thin metal strip is of the type used in conventional tape measures and has an arcuate contour 48, best seen in FIG. 3. The cable support strip 28 is attached at one end 34 to the trough lower wall 46 by clamp 30. The cable support strip is attached at a second end 36 to the tool head 16 by clamp 32. Similarly to the ribbon cable 24, one end of the cable support strip 28 moves with the tool head 16 as it traverses the length of the tool head support 14. Therefore, to facilitate the tool head's motion, sufficient slack must be provided in the cable support strip 28 as well. Accordingly, the cable support strip 28 is positioned in the semi-enclosed interior area 40 in the form of vertical loop having an upper support strip length 52 positioned above a lower support strip length 54 with the upper support strip length 52 and the lower support strip length 54 connected to one another by a 180° bend 56 in the support strip. As the tool head 16 traverses the length of the tool head support 14, one end of said cable support strip 32 moves with the tool head 16, and causes one of the upper or lower support strip lengths 52, 54 to increase while the other decreases. The ribbon cable 24 is positioned so that the upper length 33 of the cable overlies and is vertically supported by the upper support strip length 52 Turning now to FIG. 2, the first clamp comprises a clamping bar 58 having first end 60, second end 62, an upper surface 64 and a lower surface 66. The lower surface 66 having a step 68 such that the lower surface second end 70 is upwardly offset from the lower surface first end 72. The clamping bar 58 is attached at the lower surface first end 72 to the trough lower wall 46. A gap 73 is created between the trough lower wall 46 and the lower surface second end 70. The clamping bar has a threaded hole 74 extending through the second end 62. The cable support strip 28 is positioned in the gap 73 under the lower surface second end 70. A portion of the ribbon cable 24 is positioned in the gap 73 between the ribbon cable support strip 28 and the trough lower wall 46. A screw 76 is threadedly engaged in the threaded hole 74 and is in pressing engagement with the cable support strip 28 thereby clamping both the cable support strip 28 and the ribbon cable 24 at a single point between the screw and the trough member lower wall. While a screw is shown and described herein, it should be understood that in its broader aspects, the present invention is not limited in this regard and that other forms of fasteners may be substituted for the ones illustrated.

Due to the arcuate contour 48 of the cable support strip 28, stresses induced by fatigue associated with the motion of the tool head 16 are greatly reduced by clamping at a single point. If the clamping force was applied across the entire width of the cable support strip, the arcuate contour would be deformed and the induced stresses greatly increased.

Figure 3:
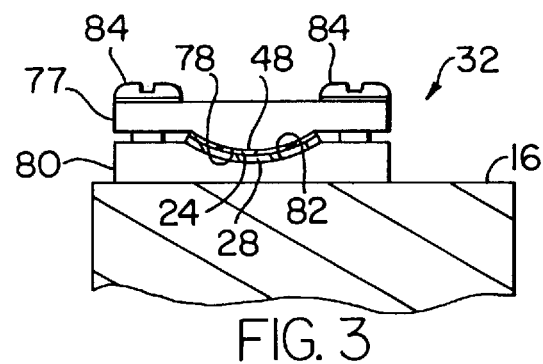
FIG. 3 is a partly in section view of the second clamping means of the ribbon support device of the present invention.

Referring to FIG. 3, the second clamp 32 is attached to the tool head 16. The second clamp 32 has an upper clamp member 77 and a lower clamp member 80. The upper clamp member has a convex portion 78 with substantially the same arcuate contour as the cable support strip 28. The lower clamp member 80 has a concave 7 portion 82, also having substantially the same arcuate contour as the transverse width of the cable support strip 28. The upper and lower clamp members 77 and 80 are connected by screws 84, 84 such that the cable support strip 28 and the ribbon cable 24 are clamped between the upper and lower clamp members 77 and 80 without significantly deforming the arcuate contour of the transverse width of the cable support strip 28. While screws are shown and described herein, it should be understood that in its broader aspects, the present invention is not limited in this regard and that other forms of fasteners may be substituted for the ones illustrated.

It is to be understood that the form of the invention shown and described herein is to be taken as a preferred embodiment of the same, and that various changes in the selection of parts comprising the broadly defined means and in the arrangement of said parts may be resorted to without departing from the spirit of the invention or the scope of the following claims.

We claim:

1. A plotter having a ribbon cable support device, said plotter comprising:

a frame an elongated tool head support, carried by said frame and having a predetermined length;

a tool head slidably mounted to said support for movement along said length of said support;

a drive means, associated with said tool head for driving said tool head back and forth along the length of said support in response to commands issued from said controller;

a vertically looped ribbon cable having upper and lower lengths connected to one another by a 180° bend and having one end attached to said tool holder, and a second end in communication with said controller, said ribbon cable having sufficient slack between said tool holder and said controller to allow said one end of said ribbon cable to move with said tool head as it traverses said length of said support; and a support device for said ribbon cable, said support device including a trough mounted to said frame and providing an interior channel containing said cable and defined by a rear wall and opposed upper and lower walls, an elongated cable support strip having one end attached by a first clamping means to said lower wall of said trough, a second end attached by a second clamping means to said tool holder so as to cause said support strip to assume a vertically looped shape having an upper support strip length positioned above a lower support strip length with said upper support strip length and said lower support strip length connected to one another by a 180° bend in said support strip and so that as said tool head traverses the length of said tool head support, said one end of said cable support strip moves with said tool head, and causes one of said upper or lower support strip lengths to increase while the other decreases; and said ribbon cable being positioned so that said upper length of said cable overlies and is vertically supported by said upper support strip length.

2. The plotter of claim 1 wherein said cable support strip has a transverse width having an arcuate contour.

3. The plotter of claim 1 wherein said first clamping means comprises:

a clamping bar having a first and second end, and an upper and lower surface, said lower surface having a step such that said lower surface second end is upwardly offset from said lower surface first end;

said clamping bar being attached at said lower surface first end to said trough lower wall;

said clamping bar having a threaded hole extending through said second end;

one of said cable support strip opposed ends being positioned under said lower surface second end, said step creating a gap between said clamping bar lower surface and said cable support strip;

a portion of said cable being positioned between said cable support strip and said trough lower wall; and a fastener threadely engaged in said threaded hole and in pressing engagement with said cable support strip thereby clamping said cable support strip and said portion of said ribbon cable at a single point between said fastener and said trough member lower wall.

4. The plotter of claim 2 wherein said second clamping means comprises:

an upper clamp member having, a convex portion having substantially the same arcuate contour as said transverse width of said cable support strip;

a lower clamp member having a concave portion having substantially the same arcuate contour as said transverse width of said cable support strip;

said cable support strip and said ribbon cable being interposed between said concave and convex portions such that said convex portion seats within said concave portion; and said upper and lower clamp members being connected by fastening means, such that said cable support strip and said ribbon cable are clamped between said upper and lower clamp members without significantly deforming the arcuate contour of the transverse width of said cable support strip.

5. The plotter of claim 1 wherein said cable support strip is metal.

* * * * *

UNITED STATES PATENT AND TRADEMARK OFFICE
CERTIFICATE OF CORRECTION

PATENT NO. : 5,768,789

DATED : June 23, 1998

INVENTOR(S) : Tortora, et al.

It is certified that error appears in the above-identified patent and that said Letters Patent is hereby corrected as shown below:

Column 3, line 48, delete "16" and insert --18--.

Column 3, line 49, delete "18" and insert --20--.

Signed and Sealed this

Ninth Day of February, 1999

Attest:

Attesting Officer

Acting Commissioner of Patents and Trademarks